(12) United States Patent
Larsen et al.

(10) Patent No.: US 8,802,321 B2
(45) Date of Patent: Aug. 12, 2014

(54) HORIZONTALLY GRADED STRUCTURES FOR ELECTROCHEMICAL AND ELECTRONIC DEVICES

(75) Inventors: Peter Halvor Larsen, Roskilde (DK); Peter Vang Hendriksen, Hilleroed (DK); Soren Linderoth, Roskilde (DK); Mogens Mogensen, Lynge (DK)

(73) Assignee: Technical University of Denmark, Lyngby (DK)

( * ) Notice: Subject to any disclaimer, the term of this patent is extended or adjusted under 35 U.S.C. 154(b) by 346 days.

(21) Appl. No.: 12/191,568

(22) Filed: Aug. 14, 2008

(65) Prior Publication Data

US 2009/0061287 A1 Mar. 5, 2009

(30) Foreign Application Priority Data

Aug. 31, 2007 (EP) .................................... 07017110

(51) Int. Cl.
*H01M 8/00* (2006.01)
*H01M 8/10* (2006.01)
*H01M 8/12* (2006.01)
*B05D 5/12* (2006.01)

(52) U.S. Cl.
USPC ........... 429/495; 429/482; 429/489; 429/535; 427/77; 427/115

(58) Field of Classification Search
USPC ..................... 429/12, 44, 489, 482, 495, 535; 427/115, 421, 77; 264/618; 156/297
See application file for complete search history.

(56) References Cited

U.S. PATENT DOCUMENTS

| | | | |
|---|---|---|---|
| 4,329,403 A | 5/1982 | Baker | |
| 5,171,645 A | 12/1992 | Khandkar | |
| 5,543,239 A | 8/1996 | Virkar et al. | |
| 6,228,521 B1 * | 5/2001 | Kim et al. | ............. 429/496 |
| 6,902,757 B2 | 6/2005 | Kinoshita et al. | |
| 2003/0059668 A1 | 3/2003 | Visco et al. | |
| 2004/0086633 A1 | 5/2004 | Lemmon et al. | |

(Continued)

FOREIGN PATENT DOCUMENTS

| | | | | |
|---|---|---|---|---|
| CN | 1492530 A | * | 4/2004 | ............. H01M 4/88 |
| EP | 1381102 A2 | * | 1/2004 | ............. H01M 8/10 |

(Continued)

OTHER PUBLICATIONS

Bastidas et al., "A symmetrical solid oxide fuel cell demonstrating redox stable perovskite electrodes", Journal of Materials Chemistry, Mar. 9, 2006.*

(Continued)

*Primary Examiner* — Kenneth Douyette
(74) *Attorney, Agent, or Firm* — Barnes & Thornburg LLP

(57) ABSTRACT

The present invention provides a graded multilayer structure, comprising a support layer (1) and at least 10 layers (2, 3) forming a graded layer, wherein each of the at least 10 layers (2, 3) is at least partially in contact with the support layer (1), wherein the at least 10 layers (2, 3) differ from each other in at least one property selected from layer composition, porosity and conductivity, and wherein the at least 10 layers (2, 3) are arranged such that the layer composition, porosity and/or conductivity horizontally to the support layer (1) forms a gradient over the total layer area.

38 Claims, 8 Drawing Sheets

(56) References Cited

U.S. PATENT DOCUMENTS

| | | | |
|---|---|---|---|
| 2004/0180252 A1* | 9/2004 | Wortman et al. | 429/34 |
| 2005/0092597 A1 | 5/2005 | O'Neil et al. | |
| 2007/0077476 A1* | 4/2007 | Lee et al. | 429/30 |
| 2007/0104991 A1* | 5/2007 | Devoe et al. | 429/30 |
| 2007/0172719 A1* | 7/2007 | Meinhardt et al. | 429/44 |

FOREIGN PATENT DOCUMENTS

| | | |
|---|---|---|
| EP | 1441406 | 7/2004 |
| EP | 1701402 | 9/2006 |
| JP | 07-085874 A | 3/1995 |
| JP | 2003-168449 A | 6/2003 |
| JP | 2004-221088 A | 8/2004 |
| KR | 10-2004-0040356 A | 5/2004 |

OTHER PUBLICATIONS

Sanchez et al., "High k Films", Cerac Coating Materials News, vol. 15, Issue 2, Jun. 2005.*

Sanchez et al., "Materials Designed to Produce Dense Layers", Cerac Coating Materials News, vol. 17, Issue 1, Mar. 2007.*

Sanchez-Herencia et al., "Electrical transport properties in zirconia/alumina functionally graded materials", Journal of the European Ceramic Society, 20 (2000), p. 1611-1620.*

"Development of Metal Supported Solid Oxide Fuel Cells for Operation at 500-600 C", Brandon, et al., JMEPEG (2004) 13:253-256.*

Machine Translation of: CN 1492530 A, Liu et al., Apr. 28, 2004.*

Minh et al., "Science and Technology of Ceramic Fuel Cells", Chapter 10, pp. 307-330, 1995.

Singhal et al., "High Temperature Solid Oxide Fuel Cells: Fundamentals, Design and Applications", Chapter 8, pp. 197-228, 2003.

Singhal et al., "High Temperature Solid Oxide Fuel Cells: Fundamentals, Design and Applications", Chapter 11, pp. 291-331, 2003.

Labrincha, J. A. et al., "Evaluation of Deposition Techniques of Cathode Materials for Solid Oxide Fuel Cells", Mat. Res. Bulk, vol. 28, 1993, pp. 101-109.

Wang, Z. et al., "A Study of Multilayer Tape Casting Method for Anode-Supported Planar Type Solid Oxide Fuel Cells (SOFCs)", Journal of Alloys and Compounds, vol. 437, 2007, pp. 264-268.

Annex to the European Search Report for European Patent Application No. EP 07 01 7110, Feb. 5. 2008.

Hendriksen, R V., "Model Studies of Internal Steam Reforming in Sofc Stacks", SOFC V, 1997, 10 pages.

* cited by examiner

HORIZONTALLY GRADED STRUCTURES FOR ELECTROCHEMICAL AND ELECTRONIC DEVICES

The present application claims priority, under 35 U.S.C. §119(a), of European Patent Application No. 07017110.3 which was filed Aug. 31, 2007 and which is hereby incorporated by reference herein.

FIELD OF THE INVENTION

The present invention relates to a horizontally graded multilayer structure suitable for use as an electrode in electrochemical devices and to a method for producing same. Other applications of the graded multilayer structure include protective coatings for corrosion or mechanical wear.

BACKGROUND OF THE INVENTION

In a normal Ni-yttria stabilized zirconia (YSZ) anode of a solid oxide fuel cell (SOFC), which is operated on externally reformed methane, there is a temperature distribution over the cell in the order of about 150° C. at an operational temperature of 850° C. Such a gradient has a detrimental effect on the mechanical as well as the chemical durability of the cell, and can for instance cause mechanical failure or enhanced chemical reactions in the warmest regions, as discussed, for example, in N. Q. Minh, and T. Takahashi, *Science and Technology of Ceramic Fuel Cells*, (Elsevier Science B. V., Amsterdam NL, 1995), and High Temperature Solid Oxide Fuel Cells: Fundamentals, Design and Applications, Eds. S. C. Singhal and K. Kendall. This will in return inevitably result in a performance decrease of the cell over time. It is therefore desired to level the temperature gradient, as this will result in an overall increase in cell performance because the temperature of the colder parts of the cell is increased.

In the case of an internal reformation of wet natural gas, such as methane, in the cell, the temperature gradient will be even steeper than described above due to the endothermic reforming process at the inlet, and will thus be more damaging to the cell (and stack), as disclosed, for example, in Hendriksen, P. V., Model studies of internal steam reforming in SOFC stacks, Proceedings—Electrochemical Society (1997), 97-40 (Solid Oxide Fuel Cells V).

However, if dry natural gas is employed instead, the formation of carbon will result in a fast blocking of the active sites in the anode structure. This may be prevented by using, e.g. an all-ceramic anode for direct conversion of natural gas to CO, $CO_2$ and water at the inlet which further down the stream may be replaced by Ni-containing electrode for a more efficient conversion. Carbon formation may also be prevented by a slower conversion at the inlet.

It has been suggested to use electrodes for SOFC or other electrochemical devices which are graded vertically to optimize the ionic and electronic conductivity of the electrodes. U.S. Pat. No. 5,543,239 discloses an improved electrode design for solid state devices, wherein a porous layer of electrolyte material is incorporated over the dense electrolyte, and wherein an electrocatalyst which is also continuous is incorporated into the porous layer.

EP-A-1701402 relates to systems and methods for minimizing temperature differences and gradients in solid oxide fuel cells. A manifold heat exchanger is used, which reduces thermal stress and increases cell life. Air passes from a periphery of a cell towards the cell centre, absorbs the heat, and proceeds to the manifold heat exchanger adjacent to the cell, where it absorbs further heat. Fuel is directed counter current to the air, which keeps hot spots away from the cell stack seals and directs hot air towards intense reforming areas on the cell to mitigate quenching effects of internal reforming.

U.S. Pat. No. 6,228,521 concerns a high power density solid oxide fuel cell having a cathode, electrolyte and graded porous anode. The anode is formed from NiO and zirconium oxide doped with yttrium oxide and exhibits a graded density which allows thicker and thus stronger anodes without sacrificing electrochemical performance.

U.S. Pat. No. 4,329,403 relates to an electrolyte-electrode assembly for high temperature fuel cells in which the electrolyte member is adapted to exhibit a more gradual transition in coefficient of thermal expansion in going from the anode electrode to the inner electrolyte region and in going from the cathode electrode to the inner electrolyte region.

U.S. Pat. No. 5,171,645 discloses a graded metal oxide electrolyte comprising gradations of zirconia and bismuth oxide across the cross-section of the electrolyte. The gradation of the compositional content across the wall thickness of the electrolyte from a substantially pure zirconia surface zone to a substantially pure bismuth oxide-yttria surface zone minimizes the stress at the interfaces between the various compositional zones.

US-A1-2005/0092597 relates to a method of forming a thin-film fuel cell electrode, comprising the provision of a substrate and at least one deposition device; developing a deposition characteristic profile having at least one porous layer based on pre-determined desired electrode properties; and forming a film in accordance with said deposition material from said deposition device while varying a relative position of said substrate in relation to said deposition device with respect to at least a first axis.

As the deposition device, sputter guns are used. However, said sputter guns result in varying thickness as the overlapping areas are thicker than the surrounding areas, which leads to unwanted variations of the layer properties in a horizontal direction. Furthermore, with sputtering, only thin layers well below 1 μm can be provided, which is too thin for applications in solid oxide cells as employed today, where well performing electrodes typically has electrochemical activity in thicknesses of 10-15 microns. Moreover, sputtering is a very slow and expensive process and thus is very cost intensive, prohibiting large scale production. Further to that it is difficult to achieve porous layers and there is also a significant waste material when sputtering methods are used (preparation of targets and material deposited outside of the substrate).

J. A. Labrincha et al., "Evaluation of deposition techniques of cathode materials for solid oxide fuel cells", Mat. Res. Bull., Vol. 28, pp. 101-109, 1993, discusses specific cobaltates and manganates as cathode materials for solid oxide fuel cells, wherein the cathode layer was applied on an electrolyte layer by sputter deposition.

EP-A-1441406 discloses a method for making a fuel cell anode, comprising the steps of:
  depositing a first film on a first end region of a substrate, wherein the first film is preferentially catalytically active towards substantially unreformed hydrocarbon fuel; and
  depositing a second film on a second end region of the substrate, the second end region opposed to the first end region, wherein the second film is preferentially catalytically active towards at least one of substantially reformed or partially reformed hydrocarbon fuel, by-products thereof and mixtures thereof.

US-A-2004/0086633 discloses a method for the fabrication and evaluation of electrode and electrolyte materials for use in solid oxide fuel cells, the method comprising:

providing a non-sintered or partially-sintered substrate; and delivering the electrode and electrolyte materials to a plurality of regions of the substrate using a plurality of liquid spraying devices, wherein the plurality of liquid spraying devices are arranged at appropriate angels to the substrate and to each other such that the spray plumes of the spraying devices overlap to form a gradient array.

Z. Wang et al., "A study of multilayer tape casting method for anode-supported planar type solid oxide fuel cells", Journal of Alloys and Compounds 437 (2007) 264-268, relates to a multilayer tape casting and co-sintering process to fabricate a large area anode-supported electrolyte film for reduced temperature solid oxide fuel cells.

However, there is still a need for graded multilayer structures having a suitable thickness of ca. 10 microns or more, which may be used as anodes in solid oxide fuel cells, which have a sufficient horizontal grading without the layer having any significant thickness variations, having an improved life time, and which can be produced in a cost efficient way without much waste material in view of the desires and requirements for industrial large scale production.

SUMMARY OF THE INVENTION

According to one aspect of the present invention, a graded multilayer structure is provided that comprises a support layer (1) and at least 10 layers (2, 3) forming a graded layer, wherein each of the at least 10 layers (2, 3) is at least partially in contact with the support layer (1), wherein the at least 10 layers (2, 3) differ from each other in at least one property selected from layer composition, porosity and conductivity, and wherein the at least 10 layers (2, 3) are arranged such that the layer composition, porosity and/or conductivity horizontally to the support layer (1) forms a gradient over the total layer area.

According to another aspect of the present invention, a graded multilayer structure is provided that comprises a support layer (1) and at least two layers (2, 3) forming a graded layer, wherein each of the at least two layers (2, 3) is at least partially in contact with the support layer (1), wherein the at least two layers (2, 3) differ from each other in at least one property selected from layer composition, porosity and conductivity, wherein the at least two layers (2, 3) are arranged such that the layer composition, porosity and/or conductivity horizontally to the support layer (1) forms a gradient over the total layer area, and wherein the overall thickness of the graded layer comprising the at least two layers (2, 3) is more than 5 µm.

According to yet another aspect of the present invention, a method is provided for producing the above graded multilayer structure. The method includes the steps of:

providing a support layer (1);
applying a first layer (2) on top of said support layer (1);
applying a second layer (3) such that the second porous layer (3) is at least partially in contact with the support layer (1);
applying a third to tenth layer such that the each of said layers is at least partially in contact with the support layer (1);
optionally applying at least one further layer such that the further layer is at least partially in contact with the support layer (1); and
laminating the multilayer structure;
wherein the application of each of the layers is carried out by tape-casting or screen printing.

In regard to another aspect of the present invention, a method for producing the above graded multilayer structure is provide that includes the steps of:

providing a support layer (1);
applying a first layer (2) on top of said support layer (1);
applying a second porous layer (3) such that the second layer (3) is at least partially in contact with the support layer (1);
optionally applying at least one further layer such that the further layer is at least partially in contact with the support layer (1); and
laminating the multilayer structure,
wherein the application of each of the layers is carried out by tape-casting or screen printing.

DETAILED DESCRIPTION OF THE INVENTION

The present invention relates to a graded multilayer structure, comprising a support layer (1) and at least 10 layers (2, 3) forming a graded layer, wherein each of the at least 10 layers (2, 3) is at least partially in contact with the support layer (1), wherein the at least 10 layers (2, 3) differ from each other in at least one property selected from layer composition, porosity and conductivity, and wherein the at least 10 layers (2, 3) are arranged such that the layer composition, porosity and/or conductivity horizontally to the support layer (1) forms a gradient over the total layer area.

Figure 1:
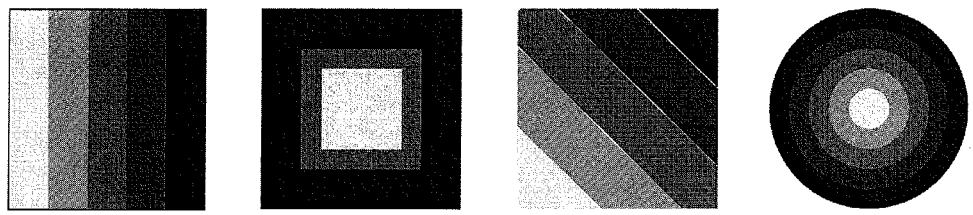
FIG. 1 illustrates different grading patterns.

Examples of grading patterns are given in FIG. 1, including a gradient along the edges, diagonal or circular gradients; only a part of all layers is shown for better illustration of the principle. Such structures are suitable for use especially as electrodes in electrochemical devices where differences in performance or properties across a layer are advantageous. This is particularly the case for solid oxide cells (SOC) and membrane cells for oxygen or hydrogen separation, where an accurate control of the local electrochemical activity enhances the overall efficiency and durability. Other applications include protective coatings for corrosion or mechanical wear.

The gradient may apply to all properties of the layer in question, and may for instance comprise one or more of the following properties: composition, porosity, impurity level, conductivity, density, abrasiveness, mechanical strength, materials cost etc.

Figure 2:
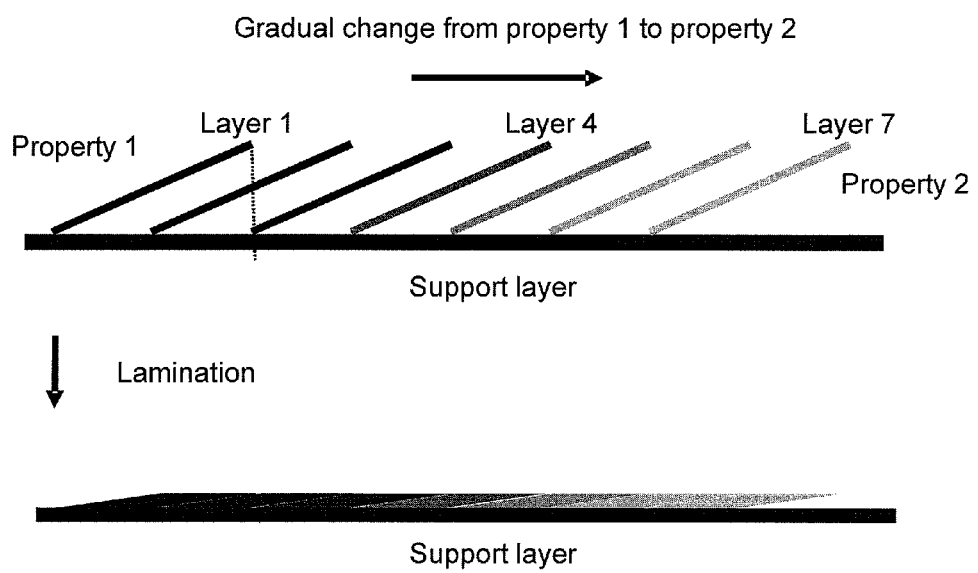
FIG. 2 illustrates one embodiment of the present invention, wherein the layers overlap; only a part of all layers is shown.
Figure 3:
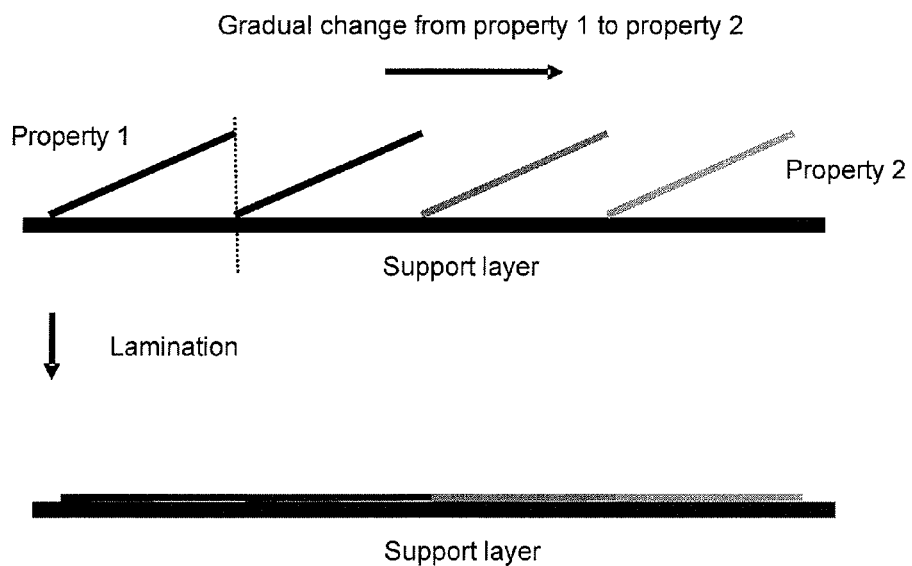
FIG. 3 illustrates another embodiment of the present invention, wherein the layers do not overlap; only a part of all layers is shown.

The graded layer comprises at least 10 layers. The general principle is illustrated in FIG. 2 wherein the graded multilayer structure comprises seven illustrated layers forming a horizontal grading. Layer 1 has property 1 and layer 7 has property 2. The layers in between can be fine tuned to change linearly or by any other gradient from property 1 to property 2 between layer 1 and layer 2. In FIG. 2, the layers next to each other are depicted as overlapping layers. This is however not necessary, as illustrated in FIG. 3, where the layers are adjacent to each other. As may also be taken from FIG. 1, the grading does not necessarily have to change from one limit to the other going from edge to edge, but may undergo local maxima and/or minima instead.

In another embodiment, the present invention provides a graded multilayer structure, comprising a support layer (1) and at least two layers (2, 3) forming a graded layer, wherein each of the at least two layers (2, 3) is at least partially in contact with the support layer (1), wherein the at least two layers (2, 3) differ from each other in at least one property selected from layer composition, porosity and conductivity, wherein the at least two layers (2, 3) are arranged such that the layer composition, porosity and/or conductivity horizontally to the support layer (1) forms a gradient over the total layer area, and wherein the overall thickness of the graded layer comprising the at least two layers (2, 3) is more than 5 µm.

While in this embodiment the multilayer structure may have only two layers, the overall layer thickness of the graded layer is at least more than 5 µm in view of the requirements for multilayer structures used in solid oxide fuel cells. Of course, the multilayer structure may have more layers, for example more than 10 layers, as described earlier, as long as the overall thickness of the at least two layers (2, 3) is more than 5 µm.

By thickness of the graded layer, it is meant that the thickness of the overall graded layer after sintering, as measured vertically from the support layer, is more than 5 µm. Preferably, the thickness is from 5 µm to 200 µm, more preferably of from 8 µm to 150 µm, and most preferably of from 10 µm to 40 µm. By contrast, the thickness of each individual layer (2,3), not to be confused with the overall thickness of the graded layer will be described further below.

In some embodiments, the thickness over the whole graded multilayer structure is identical without thickness variations, i.e. the overall thickness does not vary from layer to layer, which would result in a uneven structure.

In one embodiment, the layers (2,3) of the graded structure are at least partially in contact with the support layer (1) and in contact with at least one other layer. The surface of the layers (2,3) which is contact with the support layer (1) may also contact the surface of at least one of the other layers (2,3).

The number of layers may be finetuned to any number of layers, depending on the desired application. However, in the first embodiment of the present invention, at least 10 layers are required to provide sufficient grading over the whole layer. In view of the overall costs of the process for obtaining the graded multilayer structure, a preferred number of layers is at least 20, more preferred at least 30, and even more preferred at least 40. Of course, the more layers are employed, the better the smooth and continuous grading of the respective property may be adjusted. Depending on the desired application, the suitable number of layers may be chosen.

An additional layer (4) is preferably present on top of the layers (2, 3). The additional layer contact all of the layers (2, 3).

In one embodiment, the layers (2, 3) are porous layers. The layers being porous is advantageous for applications such as solid oxide cells, including solid oxide fuel cells and solid oxide electrolysis cells.

Suitable materials for at least one of the layers (2, 3) being intended as a fuel electrode for solid oxide cells (SOFC's/SOEC'S) include compositions comprising doped zirconia, doped ceria, doped gallates, doped chromium manganites, doped titanites and/or a metal oxide. Specific examples of suitable materials include LSCM $(La_{1-x}Sr_x)_s(Cr_{1-y}Mn_y)O_{3-\delta}$, yttria stabilized zirconia (YSZ), scandia yttria stabilized zirconia (SYSZ), STN $Sr_s(Ti_{1-y}Nb_y)O_{3-\delta}$, and CGO $Ce_{1-x}Gd_xO_{2-\delta}$, with $0<x/y\le 1$ and $0<\delta\le 1$.

Suitable materials for at least one of the layers (2, 3) being intended as an air electrode for solid oxide cells (SOFC's/SOEC'S) include compositions comprising doped zirconia, doped ceria, doped gallates, doped manganites and/or doped ferrite/cobaltites. Specific examples of suitable materials include, LSC $(La_{1-x}Sr_x)_sCoO_{3-\delta}$, $(La_{1-x}Sr_x)_sMnO_{3-\delta}$, yttria stabilized zirconia (YSZ), scandia yttria stabilized zirconia (SYSZ), CGO $Ce_{1-x}Gd_xO_{2-\delta}$, LSCF $(La_{1-x}Sr_x)_s(Co_{1-y}Fe_y)O_{3-\delta}$, and the like, with $0<x/y\le 1$ and $0<\delta\le 1$.

Suitable materials for at least one of the layers (2, 3) being intended as an electrode for separation membranes include compositions comprising doped zirconia, doped ceria, doped gallates and/or Ru. Specific examples of suitable materials include MgO, CGO $Ce_{1-x}Gd_xO_{2-\delta}$, Ru, LSCr $(La_{1-x}Sr_x)CrO_{3-\delta}$, LSCrF $(La_{1-x}Sr_x)_s(Cr_{1-y}Fe_y)O_{3-\delta}$, yttria stabilized zirconia (YSZ), scandia yttria stabilized zirconia (SYSZ), CGO $Ce_{1-x}Gd_xO_{2-\delta}$, and LSC $(La_{1-x}Sr_x)_sCoO_{3-\delta}$, with $0<x/y\le 1$ and $0<\delta\le 1$.

Suitable materials for at least one of the layers (2, 3) being intended as a protective coating include compositions comprising doped manganite/cobaltites and metal oxides, LSC $(La_{1-x}Sr_x)_sCoO_{3-\delta}$, with $0<x\le 1$ and $0<\delta\le 1$, and/or $Al_2O_3$ and the like.

Other suitable materials for at least one of the layers (2, 3) are disclosed in EP-A-1760817 and EP-A-06024339.

The thickness of each individual layer (2,3) of the graded layer is preferably from about 5 µm to 200 µm, more preferably from about 10 µm to 40 µm, measured in the green state, i.e. prior to sintering.

The porosity of the layers (2, 3), in case the layers are porous layers, is preferably from 5% to 60%, more preferably from 10% to 40%, and even more preferably from 15% to 30%. In case the porosity forms a gradient, of course the porosity of each layer is different from each other. In case the gradient is formed by different conductivity or layer composition, the porosity of each layer may be the same or be different, or the layers may not be porous at all, depending on the desired application.

The present invention further provides a solid oxide fuel cell, comprising the above graded multilayer structure. Advantageously, the SOFC exhibits a reduced temperature gradient across the cell, and thus an improved lifetime. In one embodiment, the graded multilayer structure of the present invention forms an electrode layer in said SOFC. The accurate control of the local electrochemical activity due to the fine tuning of the grading and thereby influencing the layer properties enhances the overall efficiency and durability of the cell.

The present invention also provides a method for producing the above graded multilayer structure of the first embodiment, comprising the steps of:

provide a support layer (1);

applying a first layer (2) on top of said support layer (1);

applying a second layer (3) such that the second layer (3) is at least partially in contact with the support layer (1);

applying a third to tenth layer such that the each of said layers is at least partially in contact with the support layer (1);

optionally applying at least one further layer such that the further layer is at least partially in contact with the support layer (1); and laminating the multilayer structure;

wherein the application of each of the layers is carried out by tape-casting or screen printing.

The present invention moreover provides in the second embodiment a method for producing the graded multilayer structure, comprising the steps of:

providing a support layer (1);

applying a first layer (2) on top of said support layer (1);

applying a second porous layer (3) such that the second layer (3) is at least partially in contact with the support layer (1);

optionally applying at least one further layer such that the further layer is at least partially in contact with the support layer (1); and laminating the multilayer structure, wherein the application of each of the layers is carried out by tape-casting or screen printing, and wherein the overall thickness of the graded layer comprising the at least two layers (2, 3) is more than 5 μm.

In one embodiment, the second layer (3) is applied such that the second and each further layer (3) is at least partially in contact with the support layer (1) and in contact with the first and each further layer, respectively (2); and the optional at least one further layer is applied such that the further layer is at least partially in contact with the support layer (1) and in contact with at least one layer.

In one embodiment, the second layer (3) is applied such that the second porous layer (3) is at least partially in contact with the support layer (1) and in contact with the first layer (2), and the least 10 layers and the optional layer being in contact with the support layer (1) also contact the surface of at least one of the at least 10 layers (2, 3).

Advantageously, tape casting or screen printing results in an even height of the applied layers. Especially preferred is tape-casting in view of the small amount of waste produced, and in view of the simple manufacture requirements. This allows for a more cost efficient apparatus and in return for a large scale production of the multilayer structures. Especially sputtering as a process is however disadvantageous and not cost effective for producing multilayer structures in an industrial scale.

Sputtering however is not suitable for application of layers at a large scale production, as much waste material will result in additional costs. Furthermore, the graded structure will be uneven. Especially if the multilayer structure is for application in a cell stack of a solid oxide cell, in which many cells are stacked in series, planar layers are imperative for the performance of the cell. Therefore, in the present invention, the application of the respective layers (2, 3) is not carried out by sputtering in some embodiments.

The lamination is generally carried out at elevated temperatures, with a temperature of at least 100° C. being preferred, and a temperature of at least 120° C. being more preferred.

The layers (2, 3) in some embodiments are porous layers as mentioned above.

The present invention finally provides a graded multilayer structure, comprising a support layer (1) and 10 layers (2, 3), wherein each of the layers (2, 3) is at least partially in contact with the support layer (1), wherein the layers (2, 3) differ from each other in at least one property selected from layer composition, porosity and conductivity, and wherein the layers (2, 3) are arranged such that the layer composition, porosity and/or conductivity horizontally to the support layer (1) forms a gradient over the total layer area, the graded multilayer structure being obtainable by the above processes.

In another embodiment of the present invention, the graded multilayer structure is used in a solid oxide cell.

The above described horizontal grading may be achieved by, but is not limited to, the following methods:

manufacture of individual layers by tape-casting. After drying, the individual layers are placed on a support and laminated or 2) alternatively the individual layers are placed directly on to final substrate. A sintering step is normally required to consolidate the particles in the layers, but in case of contact layers for SOC this may not be necessary.

screen printing, manufacture of horizontal grading due to the high precision in the printing process, where individual layers may be deposited with an accuracy of around 1 micrometer.

Aspects mentioned in regard to an embodiment of the invention may also be applied to other embodiment as well, and vice versa.

The horizontally graded structure may be employed as an electrode in solid oxide cells, such as solid oxide fuel cells including both, SOFCs for reformed natural gas and for direct conversion of natural gas, solid oxide eletrolysis cells, further in membranes, for example membranes for syngas production, membranes for oxygen production, or as a graded corrosion protection coating.

In the following, the invention will be illustrated by Examples. It is however not intended to limit the invention thereto.

EXAMPLES

Example 1

Formation of a SOFC Anode for Reformed Natural Gas—LSCM/Ni

An SOFC anode for reformed natural gas having a graded composition parallel to the direction of the anode gas flow is obtained. The compositions of each of the layers are formed such that an increased electrochemical activity from right to left (gas inlet to outlet) is achieved. The multilayer structure is illustrated in FIG. 2; not all layers are shown.

Layer 1 consists of LSCM, $(La_{1-x}Sr_x)_s(Cr_{1-y}Mn_y)O_{3-\delta}$, and layer 10 consists of 95 vol % NiO and 5 vol % LSCM. Layers 2 to 10 consist of a linear grading with Layer 6 having a 1:1 ratio. The electrochemical conversion for $H_2$ is low for LSCM, and high for Ni.

In the first step, ten tapes are produced. Suspensions for tape-casting are manufactured by means of ball milling of powders with polyvinyl pyrrolidone (PVP), polyvinyl butyral (PVB) and EtOH+MEK as additives. The suspensions are tape-cast using a double doctor blade system and the tapes are subsequently dried.

Layer 1: The suspension comprised LSCM. The green thickness of the tape-cast layer was about 40 μm. The porosity of this layer was about 30% after sintering.

Layer 2: The suspension comprised 83 vol % LSCM and 17 vol % NiO. The green thickness of the tape-cast layer was about 40 μm. The porosity of this layer was about 30% after sintering and reduction of NiO.

Layer 3: The suspension comprised 75 vol % LSCM and 25 vol % NiO. The green thickness of the tape-cast layer was about 40 μm. The porosity of this layer was about 30% after sintering and reduction of NiO.

Layer 4: The suspension comprised 66 vol % LSCM and 34 vol % NiO. The green thickness of the tape-cast layer was about 40 μm. The porosity of this layer was about 30% after sintering and reduction of NiO.

Layer 5: The suspension comprised 58 vol % LSCM and 42 vol % NiO. The green thickness of the tape-cast layer was about 40 μm. The porosity of this layer was about 30% after sintering and reduction of NiO.

Layer 6: The suspension comprised 50 vol % LSCM and 50 vol % NiO. The green thickness of the tape-cast layer was about 40 μm. The porosity of this layer was about 30% after sintering and reduction of NiO.

Layer 7: The suspension comprised 34 vol % LSCM and 66 vol % NiO. The green thickness of the tape-cast layer was about 40 μm. The porosity of this layer was about 30% after sintering and reduction of NiO.

Layer 8: The suspension comprised 25 vol % LSCM and 75 vol % NiO. The green thickness of the tape-cast layer was about 40 μm. The porosity of this layer was about 30% after sintering and reduction of NiO.

Layer 9: The suspension comprised 17 vol % LSCM and 83 vol % NiO. The green thickness of the tape-cast layer about 40 μm. The porosity of this layer was about 30% after sintering and reduction of NiO.

Layer 10: The suspension comprised 5 vol % LSCM and 95 vol % NiO. The green thickness of the tape-cast layer was about 40 μm. The porosity of this layer was about 30% after sintering and reduction of NiO.

In the second step, the tapes were placed onto a Mylar foil as a support layer, as illustrated in FIG. 2, and laminated by employing heated rolls in a double roll set-up, wherein the lamination took place in one pass. The temperature was about 140° C. and the pressure was about 1 bar. The overall thickness of the applied layers was about 35 μm.

The obtained laminated graded anode was ready to be build into any type of SOC cell.

Example 2

Formation of a SOFC anode for Reformed Natural Gas—YSZ-LSCM/Ni)

An SOFC anode for reformed natural gas having a graded composition parallel to the direction of the anode gas flow is obtained. The compositions of the layers are formed such that there is an increased electrochemical activity going from right to left (gas inlet to outlet). The Example is illustrated in FIG. 2; not all layers are shown.

Layer 1 consists of 40 vol % yttria stabilized zirconia (YSZ) and 60 vol % LSCM, $(La_{1-x}Sr_x)_s(Cr_{1-y}Mn_y)O_{3-\delta}$, and layer 10 consists of 40 vol % YSZ, 55 vol % NiO and 5 vol % LSCM. Layers 2 to 10 consist of a grading with Layer 7 having a 1:1 ratio of LSCM and NiO, The YSZ is kept constant at 40 vol % and LSCM and NiO sums to 60 vol %. The electrochemical activity for conversion of $H_2$ is low for LSCM and high for Ni.

In the first step, seven tapes are produced. Suspensions for tape-casting are manufactured by means of ball milling of powders with polyvinyl pyrrolidone (PVP), polyvinyl butyral (PVB) and EtOH+MEK as additives. The suspensions are tape-cast using a double doctor blade system and the tapes are subsequently dried.

Layer 1: The suspension comprised 40 vol % YSZ and 60 vol % LSCM. The green thickness of the tape-cast layer was about 45 μm. The porosity of this layer was about 30% after sintering.

Layer 2: The suspension comprised 40 vol % YSZ, 55 vol % LSCM and 5 vol % NiO. The green thickness of the tape-cast layer was about 45 μm. The porosity of this layer was about 30% after sintering and reduction of NiO.

Layer 3: The suspension comprised 40 vol % YSZ, 50 vol % LSCM and 10 vol % NiO. The green thickness of the tape-cast layer was about 45 μm. The porosity of this layer was about 30% after sintering and reduction of NiO.

Layer 4: The suspension comprised 40 vol % YSZ, 45 vol % LSCM and 15 vol % NiO. The green thickness of the tape-cast layer was about 45 μm. The porosity of this layer was about 30% after sintering and reduction of NiO.

Layer 5: The suspension comprised 40 vol % YSZ, 40 vol % LSCM and 20 vol % NiO. The green thickness of the tape-cast layer was about 45 μm. The porosity of this layer was about 30% after sintering and reduction of NiO.

Layer 6: The suspension comprised 40 vol % YSZ, 35 vol % LSCM and 25 vol % NiO. The green thickness of the tape-cast layer was about 45 μm. The porosity of this layer was about 30% after sintering and reduction of NiO.

Layer 7: The suspension comprised 40 vol % YSZ, 30 vol % LSCM and 30 vol % NiO. The green thickness of the tape-cast layer was about 45 μm. The porosity of this layer was about 30% after sintering and reduction of NiO.

Layer 8: The suspension comprised 40 vol % YSZ, 20 vol % LSCM and 40 vol % NiO. The green thickness of the tape-cast layer was about 45 μm. The porosity of this layer was about 30% after sintering and reduction of NiO.

Layer 9: The suspension comprised 40 vol % YSZ, 10 vol % LSCM and 50 vol % NiO. The green thickness of the tape-cast layer was about 45 μm. The porosity of this layer was about 30% after sintering and reduction of NiO.

Layer 10: The suspension comprised 40 vol % YSZ and 60 vol % NiO. The green thickness of the tape-cast layer was about 45 μm. The porosity of this layer was about 30% after sintering and reduction of NiO.

In the second step, the tapes were placed onto a Mylar foil (support layer) as illustrated in FIG. 2 and laminated by employing heated rolls in a double roll set-up, wherein the lamination took place in one pass. The temperature was about 140° C. and the pressure was about 1 bar. The overall thicknessof the applied layers was about 40 μm.

The laminated graded anode was ready to be build into any type of SOC cell.

Example 3

The anode obtained in Example 1 was built in an anode supported solid oxide cell. In the first step, two tapes were produced: an anode support tape (AS) and an electrolyte tape (E). Suspensions for tape-casting are manufactured and cast as described in Example 1.

AS-layer: The suspension comprised 45 vol % yttria stabilized zirconia (YSZ) and about 55 vol % NiO powder. The green thickness of the tape-cast layer was about 400 μ. The porosity of this layer was about 35% after sintering and reduction.

E-layer: The suspension comprised scandia yttria stabilized zirconia (SYSZ) the green thickness of the tape-cast layer was about 15 μm.

In the second step, the AS and E tapes were laminated together with a graded tape manufactured as described in Example 1. The order of lamination was: AS/graded anode/E. Lamination is performed by employing heated rolls in a double roll set-up. The temperature was about 140° C. and the pressure was about 1 bar.

In the third step, the laminated tapes were cut into the desired shapes. This was done by knife punching resulting in areas of 12×12 cm² after sintering.

In the fourth step, the half-cell was sintered. The half-cell was placed in a furnace and sintered at about 1300° C. and left for about 12 hours before cooling to room temperature.

In the fifth step, a cathode was deposited on the sintered half-cell by screen printing an ink comprising a 1:1 weight ratio mixture of $La_{0.75}Sr_{0.25}MnO_{3-\delta}$ and SYSZ on the surface of the electrolyte layer (E). The thickness of the printed layer was 30 μm before sintering.

The sixth step was the sintering of the cell in a furnace at about 1100° C. for 2 hours before cooling to room temperature so as to obtain the SOC.

Example 4

Formation of an Anode for Direct Conversion of Natural Gas

Figure 4:
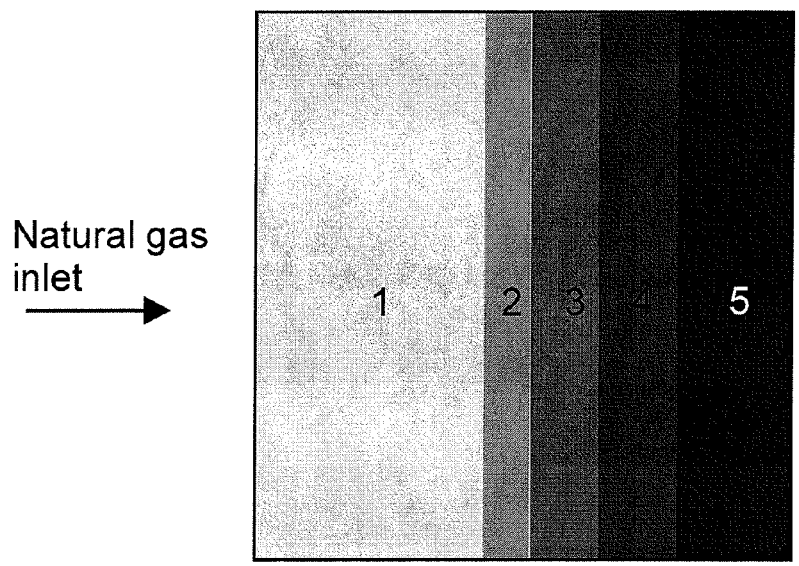
FIG. 4 illustrates a graded structure in accordance with the invention for direct conversion of natural gas; only a part of all layers is shown.

An SOFC anode for non-reformed natural gas having a graded composition parallel to the direction of the gas flow was obtained. The compositions of the layers were made such that there was an increased electrochemical activity going from right to left (gas inlet to outlet), as illustrated in FIG. 4; not all layers are shown for illustrative purposes.

The compositions of the ten layers were as follows:
Layer 1: STN, $Sr_s(Ti_{1-y}Nb_y)O_{3-\delta}$;
Layer 2: 80 vol % STN, 20 vol % CGO, $Ce_{1-x}Gd_xO_{2-\delta}$;
Layer 3: 75 vol % STN, 20 vol % CGO and 5 vol % NiO;
Layer 4: 65 vol % STN, 20 vol % CGO and 15 vol % NiO;
Layer 5: 65 vol % STN, 15 vol % CGO and 20 vol % NiO;
Layer 6: 60 vol % STN, 15 vol % CGO and 25 vol % NiO;
Layer 7: 60 vol % STN, 10 vol % CGO and 30 vol % NiO;
Layer 8: 60 vol % STN, 5 vol % CGO and 35 vol % NiO;
Layer 9: 55 vol % STN, 5 vol % CGO and 40 vol % NiO;
Layer 10: 55 vol % STN, 45 vol % NiO.

The tapes were manufactured and laminated as described in Example 1.

Example 5

The anode obtained in Example 4 was built in an electrolyte supported cell. The SOFC anode for non-reformed natural gas had a graded composition parallel to the direction of the gas flow. The compositions of the layers were made such that there was an increased electrochemical activity going from right to left (gas inlet to outlet), as illustrated in FIG. 4; however, not all layers are shown.

The first step was the manufacture of ten screen printing inks having the compositions as given above.

The second step was the deposition of the layers side by side by screen printing.

The cell was completed as outlined in Example 3.

Example 6

SOC Cathode—LSM/LSCF

In order to achieve further balance of the temperature distribution in an SOFC cell stack, the electrochemical activity of the cathode is balanced in this example. In case of cross flow of the air and fuel in the stack, the temperature in the four stack corners will under normal operational conditions be of a lower temperature as compared to the center of the stack as follows: T(air out–$H_2$ in)>T(air in–$H_2$ in)>T(air out–$H_2$ out)>T(air in–$H_2$ out).

Figure 5:
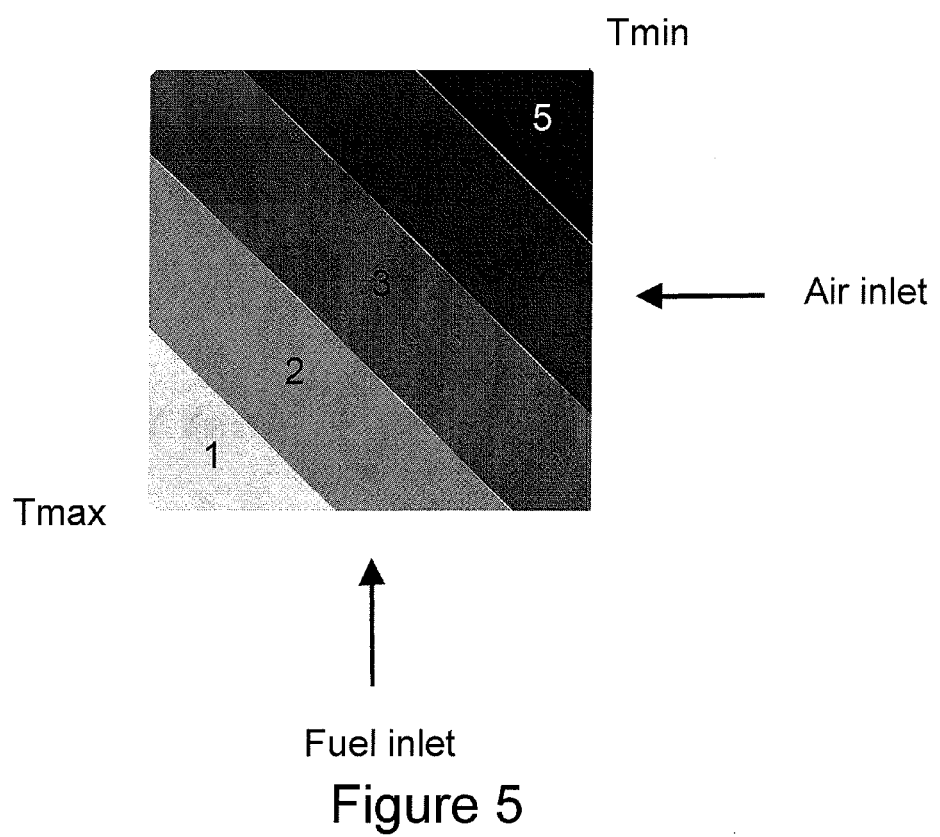
FIG. 5 illustrates a cross graded cathode in accordance with the present invention for cross flow configuration of air and fuel; only a part of all layers is shown.

The temperature distribution on the cathode side is leveled/controlled by having a cross gradient as illustrated in FIG. 5; not all layers are shown. The compositions of the layers are as follows:
Layer 1: 50 vol % CGO+50 vol % LSM 25;
Layer 2: 50 vol % CGO+38 vol % LSM+12 vol % LSCF;
Layer 3: 50 vol % CGO+35 vol % LSM+15 vol % LSCF;
Layer 4: 50 vol % CGO+25 vol % LSM+25 vol % LSCF;
Layer 5: 50 vol % CGO+22 vol % LSM+28 vol % LSCF;
Layer 6: 50 vol % CGO+20 vol % LSM+30 vol % LSCF;
Layer 7: 50 vol % CGO+18 vol % LSM+32 vol % LSCF;
Layer 8: 50 vol % CGO+15 vol % LSM+35 vol % LSCF;
Layer 9: 50 vol % CGO+12 vol % LSM+38 vol % LSCF;
Layer 10: 50 vol % CGO+50 vol LSCF.

The tapes are manufactured and laminated as described in Example 1.

Example 7

SOC Cathode—LSM/LSCF

Further balance of the temperature distribution in an SOFC cell stack may be achieved by controlling the electrochemical activity of the cathode. In case of cross flow of the air and fuel in the stack the temperature in the four stack corners will under normal operational conditions be in decreasing order of temperature: T(air out–$H_2$ in)>T(air in–$H_2$ in)>T(air out–$H_2$ out)>T(air in–$H_2$ out).

The temperature distribution on the cathode side is leveled/controlled by having a cross gradient as illustrated in FIG. 5. The compositions of the layers are as follows:
Layer 1: 50 vol % CGO+50 vol % LSCF 25;
Layer 2: 50 vol % CGO+45 vol % LSCF+5 vol % LSC;
Layer 3: 50 vol % CGO+38 vol % LSCF+12 vol % LSC;
Layer 4: 50 vol % CGO+35 vol % LSCF+15 vol % LSC;
Layer 5: 50 vol % CGO+30 vol % LSCF+20 vol % LSC;
Layer 6: 50 vol % CGO+28 vol % LSCF+22 vol % LSC;
Layer 7: 50 vol % CGO+25 vol % LSCF+25 vol % LSC;
Layer 8: 50 vol % CGO+20 vol % LSCF+30 vol % LSC;
Layer 9: 50 vol % CGO+12 vol % LSCF+38 vol % LSC;
Layer 10: 50 vol % CGO+50 vol LSC.

The tapes are manufactured and laminated as described in Example 1 in order to obtain the SOC cathode.

Example 8

Manufacture of a Cell with a Circular Design

Figure 6:
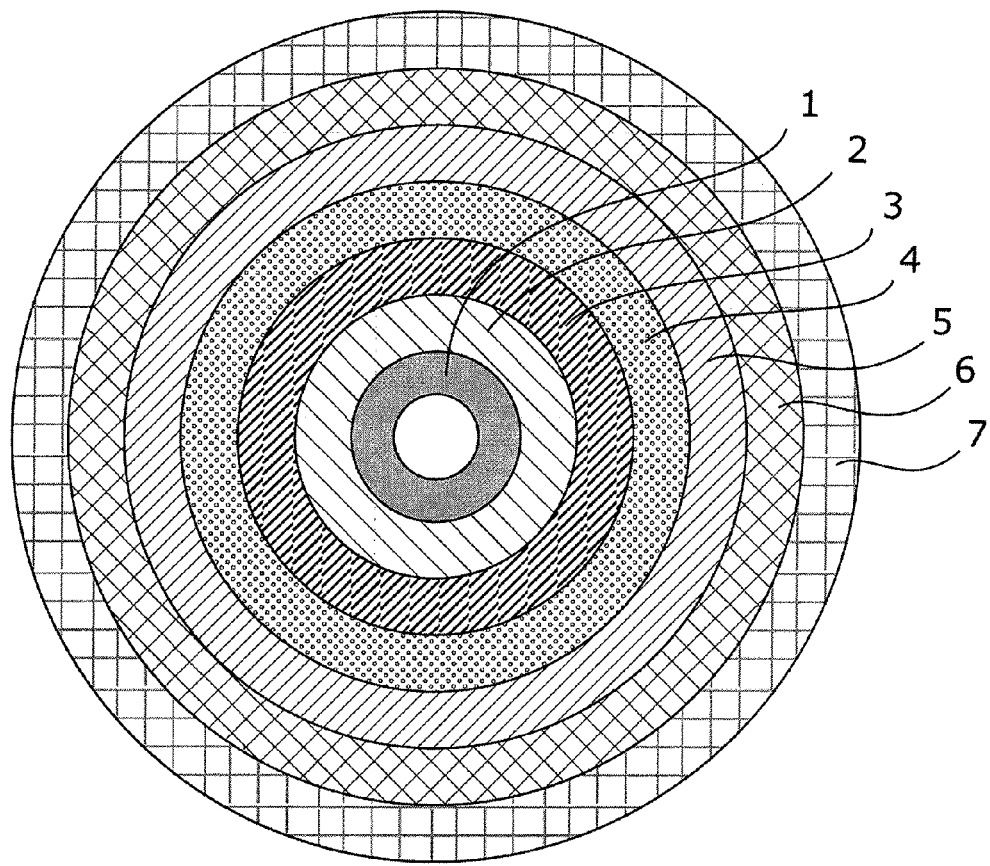
FIG. 6 illustrates a graded structure in accordance with the invention wherein the gas flow is going from the centre to the edge; only a part of all layers is shown.

A SOFC with a circular design for dry or pre-reformed natural gas being exposed to the anode was obtained. The inlet of the fuel gas was in the centre of the cell and the outlet at the edge. The anode had a graded composition from the inlet to the outlet. The compositions of the layers were made such that there was an increased electrochemical activity going from centre to edge (gas inlet to outlet), as illustrated in FIG. 6; not all layers are shown.

Layer 1 consisted of LSCM, $(La_{1-x}Sr_x)_s(Cr_{1-y}Mn_y)O_{3-\delta}$; layer 7 consisted of 66 vol % NiO and 34 vol % LSCM; and layer 10 consisted of 95 vol % NiO and 5 vol % LSCM. Layers 2 to 9 consisted of a linear grading with Layer 6 having a 1:1 ratio. The electrochemical activity for conversion of $H_2$ is low for LSCM and high for Ni.

In the first step, ten inks were manufactured. Suspensions for screen printing were produced by means of ball milling of powders with polyvinyl pyrrolidone (PVP), polyvinyl butyral (PVB) and EtOH+MEK as additives. The suspensions were screen printed onto the cell with the composition varying in a controlled manner from the center and outwards. The layers were subsequently dried.

Ink 1: The suspension comprised LSCM. The green thickness of the printed layer was about 40 µm. The porosity of this layer was about 30% after sintering.

Ink 2: The suspension comprised 83 vol % LSCM and 17 vol % NiO. The green thickness of the printed layer was about 40 µm. The porosity of this layer was about 30% after sintering.

Ink 3: The suspension comprised 75 vol % LSCM and 25 vol % NiO. The green thickness of the printed layer was about 40 µm. The porosity of this layer was about 30% after sintering.

Ink 4: The suspension comprised 66 vol % LSCM and 34 vol % NiO. The green thickness of the printed layer was about 40 µm. The porosity of this layer was about 30% after sintering.

Ink 5: The suspension comprised 58 vol % LSCM and 42 vol % NiO. The green thickness of the printed layer was about 40 µm. The porosity of this layer was about 30% after sintering.

Ink 6: The suspension comprised 50 vol % LSCM and 50 vol % NiO. The green thickness of the printed layer was about 40 µm. The porosity of this layer was about 30% after sintering.

Ink 7: The suspension comprised 34 vol % LSCM and 66 vol % NiO. The green thickness of the printed layer was about 40 µm. The porosity of this layer was about 30% after sintering.

Ink 8: The suspension comprised 25 vol % LSCM and 75 vol % NiO. The green thickness of the printed layer was about 40 µm. The porosity of this layer was about 30% after sintering.

Ink 9: The suspension comprised 17 vol % LSCM and 83 vol % NiO. The green thickness of the printed layer was about 40 µm. The porosity of this layer was about 30% after sintering.

Ink 10: The suspension comprised 5 vol % LSCM and 95 vol % NiO. The green thickness of the printed layer was about 40 µm. The porosity of this layer was about 30% after sintering.

The cell was subsequently sintered at 1150° C. in air.

Example 9

Manufacture of a Cell with a Tubular Design

Figure 7:
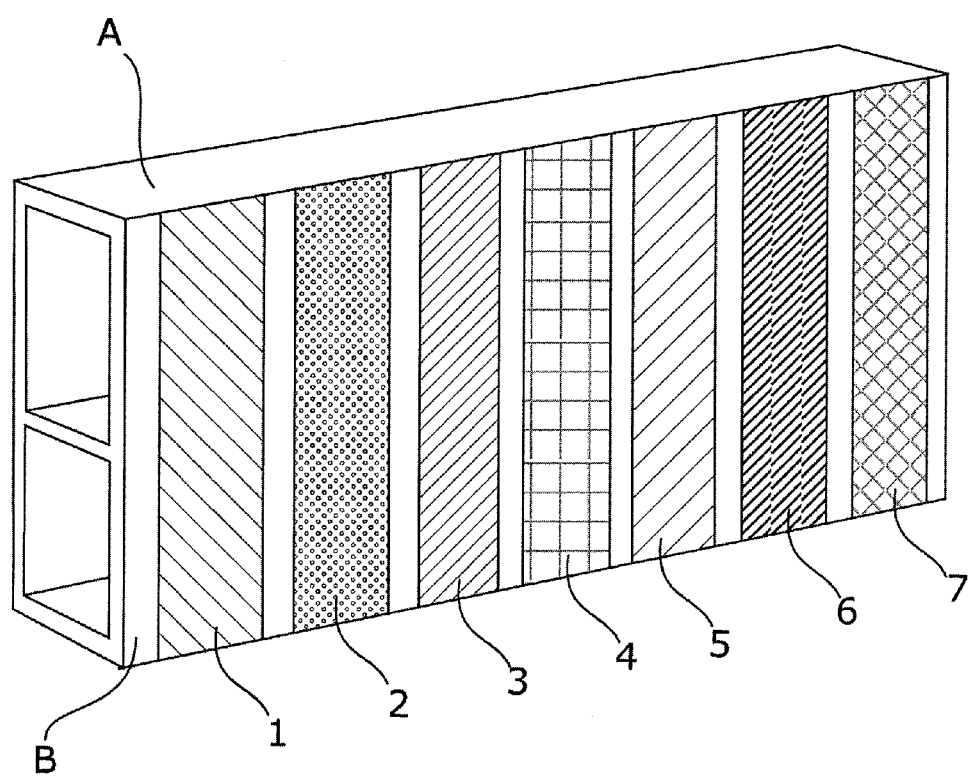
FIG. 7 illustrates a segmented fuel cell module in accordance with the invention; only a part of all layers is shown.

A tubular or flat-tubular SOFC was obtained, where the composition of the anode was graded along the tube. The grading was made such that the composition of the electrode at the inlet was the least reforming active, and with the activity increasing towards the outlet (other end) of the tube, as illustrated in FIG. 7; not all layers are shown.

Layer 1 consisted of LSCM, $(La_{1-x}Sr_x)_s(Cr_{1-y}Mn_y)O_{3-\delta}$, and layer 10 consisted of 95 vol % NiO and 5 vol % LSCM. Layers 2 to 6 consisted of a linear grading with Layer 4 having a 1:1 ratio. The electrochemical activity for conversion of $H_2$ is low for LSCM and high for Ni.

In the first step, ten slurries were produced. Suspensions for spraying were manufactured by means of ball milling of powders with polyvinyl pyrrolidone (PVP), polyvinyl butyral (PVB) and EtOH+MEK as additives. The suspensions were sprayed onto the tube with the composition varying in a controlled manner along the tube. The layers were subsequently dried.

Ink 1: The suspension comprised LSCM. The green thickness of the printed layer was about 40 µm. The porosity of this layer was about 30% after sintering.

Ink 2: The suspension comprised 83 vol % LSCM and 17 vol % NiO. The green thickness of the printed layer was about 40 µm. The porosity of this layer was about 30% after sintering.

Ink 3: The suspension comprised 75 vol % LSCM and 25 vol % NiO. The green thickness of the printed layer was about 40 µm. The porosity of this layer was about 30% after sintering.

Ink 4: The suspension comprised 66 vol % LSCM and 34 vol % NiO. The green thickness of the printed layer was about 40 µm. The porosity of this layer was about 30% after sintering.

Ink 5: The suspension comprised 58 vol % LSCM and 42 vol % NiO. The green thickness of the printed layer was about 40 µm. The porosity of this layer was about 30% after sintering.

Ink 6: The suspension comprised 50 vol % LSCM and 50 vol % NiO. The green thickness of the printed layer was about 40 µm. The porosity of this layer was about 30% after sintering.

Ink 7: The suspension comprised 34 vol % LSCM and 66 vol % NiO. The green thickness of the printed layer was about 40 µm. The porosity of this layer was about 30% after sintering.

Ink 8: The suspension comprised 25 vol % LSCM and 75 vol % NiO. The green thickness of the printed layer was about 40 µm. The porosity of this layer was about 30% after sintering.

Ink 9: The suspension comprised 17 vol % LSCM and 83 vol % NiO. The green thickness of the printed layer was about 40 µm. The porosity of this layer was about 30% after sintering.

Ink 10: The suspension comprised 5 vol % LSCM and 95 vol % NiO. The green thickness of the printed layer was about 40 µm. The porosity of this layer was about 30% after sintering.

The tube was then sintered at 1100-1400° C. in air.

Example 10

Segmented Cell Design

Figure 8:
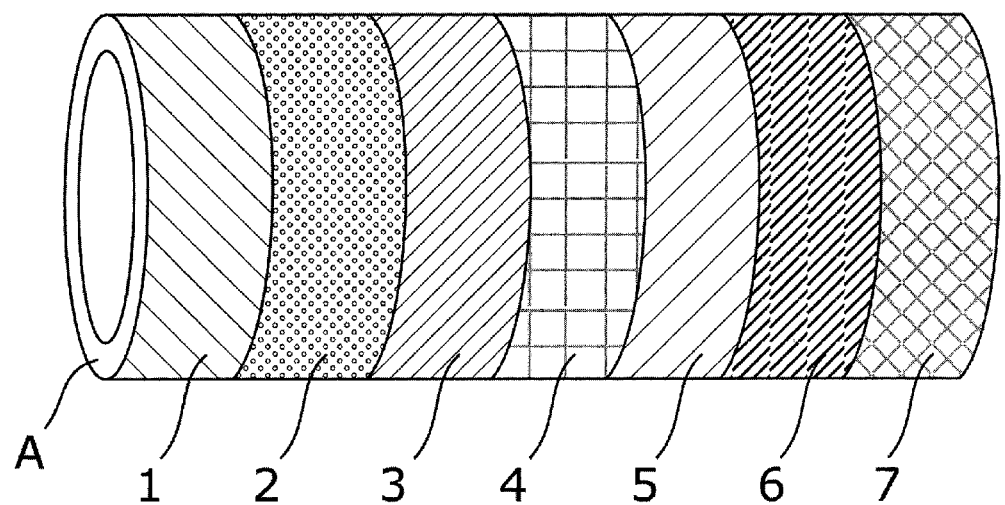
FIG. 8 illustrates a tube shaped structure in accordance with the invention with one active layer along the tube; only a part of all layers is shown.

A flat-tubular SOFC design was obtained, where the composition of the anode was graded along the segmented-flat-tube cell. The grading was obtained by the composition of the individual segments changing from segment to segment such that the inlet was the least reforming active, and with activity increasing towards the outlet of the module/cell, as illustrated in FIG. 8.

Layer 1 consisted of LSCM, $(La_{1-x}Sr_x)_s(Cr_{1-y}Mn_y)O_{3-\delta}$, and layer 10 consisted of 95 vol % NiO and 5 vol % LSCM. Layers 2 to 10 consisted of a linear grading with Layer 6 having a 1:1 ratio.

The first step was the manufacture of ten inks. Suspensions for screen printing were manufactured by means of ball milling of powders with polyvinyl pyrrolidone (PVP), polyvinyl butyral (PVB) and EtOH+MEK as additives. The suspensions were screen printed onto the cell with the composition varying in a controlled manner from the center and outwards. The layers were subsequently dried.

Ink 1: The suspension comprised LSCM. The green thickness of the printed layer was about 40 μm. The porosity of this layer was about 30% after sintering.

Ink 2: The suspension comprised 83 vol % LSCM and 17 vol % NiO. The green thickness of the printed layer was about 40 μm. The porosity of this layer was about 30% after sintering.

Ink 3: The suspension comprised 75 vol % LSCM and 25 vol % NiO. The green thickness of the printed layer was about 40 μm. The porosity of this layer was about 30% after sintering.

Ink 4: The suspension comprised 66 vol % LSCM and 34 vol % NiO. The green thickness of the printed layer was about 40 μm. The porosity of this layer was about 30% after sintering.

Ink 5: The suspension comprised 58 vol % LSCM and 42 vol % NiO. The green thickness of the printed layer was about 40 μm. The porosity of this layer was about 30% after sintering.

Ink 6: The suspension comprised 50 vol % LSCM and 50 vol % NiO. The green thickness of the printed layer was about 40 μm. The porosity of this layer was about 30% after sintering.

Ink 7: The suspension comprised 34 vol % LSCM and 66 vol % NiO. The green thickness of the printed layer was about 40 μm. The porosity of this layer was about 30% after sintering.

Ink 8: The suspension comprised 25 vol % LSCM and 75 vol % NiO. The green thickness of the printed layer was about 40 μm. The porosity of this layer was about 30% after sintering.

Ink 9: The suspension comprised 17 vol % LSCM and 83 vol % NiO. The green thickness of the printed layer was about 40 μm. The porosity of this layer was about 30% after sintering.

Ink 10: The suspension comprised 5 vol % LSCM and 95 vol % NiO. The green thickness of the printed layer was about 40 μm. The porosity of this layer was about 30% after sintering.

The cell was subsequently sintered at 1150° C. in air.

The electrolyte layers, cathode and sealants were afterwards deposited and the whole assembly sintered in air at 1250° C.

Example 11

Production of a Membrane for Syngas Production with a Graded Anode

A device for the production of synthesis gas was obtained. Methane was fed to one side of a membrane, and air to the other. The membrane was a mixed oxide ion/electronic conductor with a thickness of about 10 micrometer. To provide sufficient strength, the membrane was placed on an inert support structure with a thickness of several hundred micrometer.

On the side exposed to air an oxygen reduction catalyst layer was applied, and on the side exposed to methane, a cracking/steam reforming catalyst was applied. When in operation, oxygen permeates from the air side through the membrane to the methane side, where a partial oxidation takes placed resulting in generation of a mixture of CO and hydrogen. The temperature will change in the direction of the gas-flows as will the chemical environment on both sides of the membrane. Hence, it is beneficial to have the possibility to vary the composition of the catalyst layers on both sides of the membrane in the direction of the gas flow as to achieve a local optimisation by varying the composition horizontally to reflect the changing requirements set by the changing temperature and the changing chemical environment.

In step 1, a support tape (CGO or MgO) with a thickness of 400 micrometer was obtained.

In step 2, a graded structure "anode or catalyst layer" as outlined in example 1 was produced. Said layer was made by combining 10 tapes of different composition:

Tape 1 comprised 50 vol % support material and 50 vol % Ru-based catalyst particles;

Tape 2 comprised 50 vol % support material and 45 vol % Ru-based catalyst particles; and 5 vol % Ni based catalyst particles;

Tape 3 comprised 50 vol % support particles, 40 vol % Ru based catalyst particles, and 10 vol % Ni based catalyst particles;

Tape 4 comprised 50 vol % support material and 35 vol % Ru-based catalyst particles; and 15 vol % Ni based catalyst particles;

Tape 5 comprised 50 vol % support material, 30 vol % Ru-based catalyst particles, 20 and vol % Ni;

Tape 6 comprised 50 vol % support material and 25 vol % Ru-based catalystparticles; and 25 vol % Ni based catalyst particles;

Tape 7 comprised 50 vol % support material, 20 vol % Ru-based catalyst particles, and 30 vol % Ni;

Tape 8 comprised 50 vol % support material and 15 vol % Ru-based catalyst particles; and 35 vol % Ni based catalyst particles;

Tape 9 comprised 50 vol % support material, 10 vol % Ru-based catalyst particles, and 40 vol % Ni;

Tape 10 comprised 50 vol % support material, and 50 vol % Ni.

The tapes were placed on a mylar support and laminated as outlined in Example 1.

In step 3, the catalyst layer tape was laminated together with the manufactured support tape.

In step 4, the support and catalyst layer tape were laminated with a 25 micrometer thick membrane tape which was based on CGO.

In step 5 the laminate was sintered at 1300° C. for 5 hours.

In step 6, an oxygen reduction catalyst was applied on the membrane surface. Said layer was applied by screen printing a slurry of LSC.

In step 7, the cathode was sintered.

When operating the air and methane are fed in co-flow with side comprising the Ru catalyst of the membrane at the methane inlet. In the above structure, a more active and expensive Ru catalyst is replaced by a cheap Ni catalyst where gas composition and temperature allows for said replacement.

Example 12

Membrane for Syngas Production with a Horizontally Graded Cathode

A membrane for the same purpose as described in example 11 and manufactured in the same way was obtained. However, for the cathode application, a horizontal grading is achieved such that the composition changes in the direction of the air flow. At the inlet $La_{0.2}Sr_{0.8}CoO_3$ is used, and down stream the air side materials with less and less Sr doping are applied.

Example 13

Membrane for Oxygen Production with a Horizontally Graded Electrode

A membrane for oxygen production operating at high temperature between pressurized air and a pure oxygen permeate stream was obtained. The electrode composition varies down stream of the pressurized air such that the Sr content is gradually reduced going down stream the pressurized air 1) $SrCoO_{2.5}$, 2) $La_{0.3}Sr_{0.7}CoO_3$, 3) $La_{0.6}Sr_{0.4}CoO_3$. The membrane was obtained as described in example 11.

Example 14

Supported Membrane with Graded Composition in the Membrane (Co-firing Route)

A membrane with a composition gradient in the gas flow direction was obtained. At the methane inlet $La_{0.6}Sr_{0.4}FeO_{0.8}Cr_{0.2}O_3$ was used. In the middle section, (La,Sr)$FeO_3$ and in the outlet section, $(La,Sr)Fe_{0.8}Co_{0.2}O_3$ was applied.

In the first step, the support tape was obtained.

In the second step, the catalyst, a Ru based supported catalyst was tape cast.

Step 3 was the manufacture of a graded tape for later lamination. Tape 1 consisted of $La_{0.6}Sr_{0.4}FeO_{0.8}Cr_{0.2}O_3$, tape 2 consisted of $La_{0.6}Sr_{0.4}Fe_{0.9}Cr_{0.1}O_3$, tape 3 consisted of $La_{0.6}Sr_{0.4}Fe_{0.8}Cr_{0.2}O_3$, and tape 2 consisted of $La_{0.6}Sr_{0.4}Fe_{0.9}Cr_{0.1}O_3$, tape 3 consisted of $La_{0.6}Sr_{0.4}FeO_3$, and tape 4 consisted of $La_{0.6}Sr_{0.4}Fe_{0.9}Cr_{0.1}O_3$, tape 3 consisted of Step 4 was the lamination of the obtained tapes on each other.

Step 5 was the sintering of the obtained laminate.

In step 6, the cathode was applied on the sintered structure so as to obtain the membrane. The obtained membrane design is especially suitable for use in a counter flow device. Methane enters (and air exits) at the LSFCr side (hot and very reducing). Syngas exits and air is fed at the LSFeCo side (cold but less reducing).

Example 15

Supported Membrane with Stepwise Change in the Membrane Composition, Screen Printing A device was obtained as described in example 11, with the exception that the membrane composition changes stepwise and the membrane layers are made by screen printing.

Step 1 was the manufacture of a MgO support by extrusion or tape casting.

In step 2, the support was sintered for two hours at about 1300° C.

In step 3, the catalyst was applied by dip coating the support in a very thin slurry comprising ultrafine catalyst particles in form of a suspension.

Step 4 was the application of membrane layers in a sequence of printings, where first of all, the upstream segment was printed, consisting of $(La_{0.6}Sr_{0.4}Fe_{0.8}Cr_{0.2}O_3)$, and subsequently four more segments were printed such that a small overlap at the border between neighboring segments is ensured. The composition varied from segment to segment in the same manner as outlined in example 11.

In step 5, the component was sintered at 1325° C. for four hours.

In step 6, a porous catalyst layer was applied on top of the membrane layer by spraying so as to obtain the supported membrane.

Example 17

Supported Membrane with Stepwise Change in the Membrane Composition, Vacuum Plasma Spraying The membrane was obtained as outlined for example 15, with the exception that step 4 is replaced by a membrane application step by vacuum plasma spraying. The grading is achieved using several guns connected to different feeds.

Example 18

Patterned and Graded Corrosion Protection Coating Manufactured by "Ink Jet Printing"

To achieve long term durability, ferritic Fe/Cr steels used as interconnects may be provided by suitable protective coatings. Both $(La,Sr)CoO_3$ and $Al_2O_3$ are excellent protection material for prolonging the lifetime of steels like Crofer22APU. In a stack where electrical contact is only needed over a fraction of the area it may be desirable to apply an $Al_2O_3$ rich coating over the none current carrying areas and an $(La,Sr)CoO_3$ rich coating over the current carrying areas. A corrugated plate is considered where the cross section has the shape of a sinusoidal.

Figure 9:
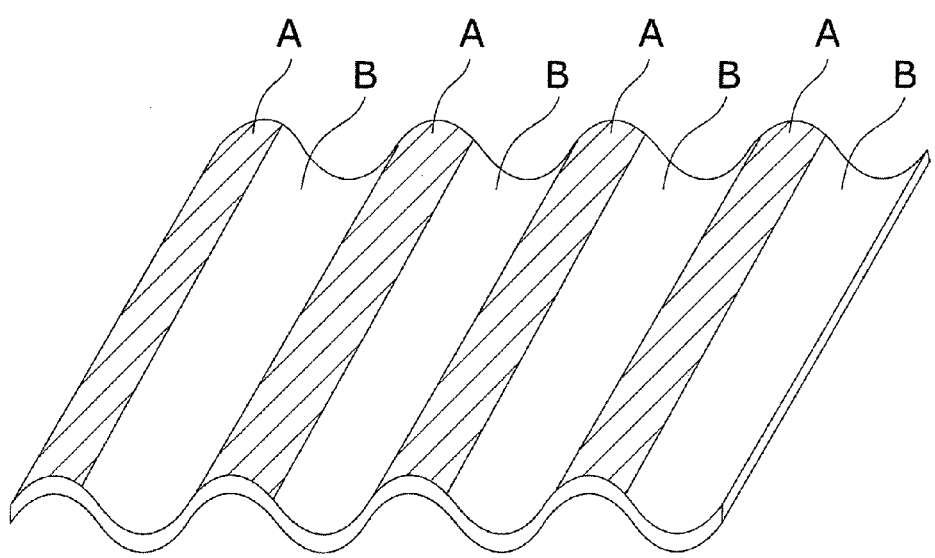
FIG. 9 illustrates another graded structure in accordance with the invention which has a roof tile form; only a part of all layers is shown.

The plate is provided with a protective coat applied in strips (See FIG. 9). At the wave tops where contact is established to the cathode a coating of $Al_2O_3$ 20% and (La,Sr) $CoO_3$ 80% was applied by printing (layer A, FIG. 9). At the "bottom of the waves" (non current carrying area) a 80% $Al_2O_3$ and 20% $(La,Sr)CoO_3$ coating was applied by printing (layer B, FIG. 9) using an ink-jet-type printing device specially suited for application of particulate slurries of the type described here. The jet was fed from two different cartridges containing the two slurries described here. The coat was applied in a line to line printing operation where the feed changes whenever jet moves in and out of the contact zones (see FIG. 9).

Example 19

Graded Corrosion Protection Coating Manufactured by Air Spraying

Figure 10:
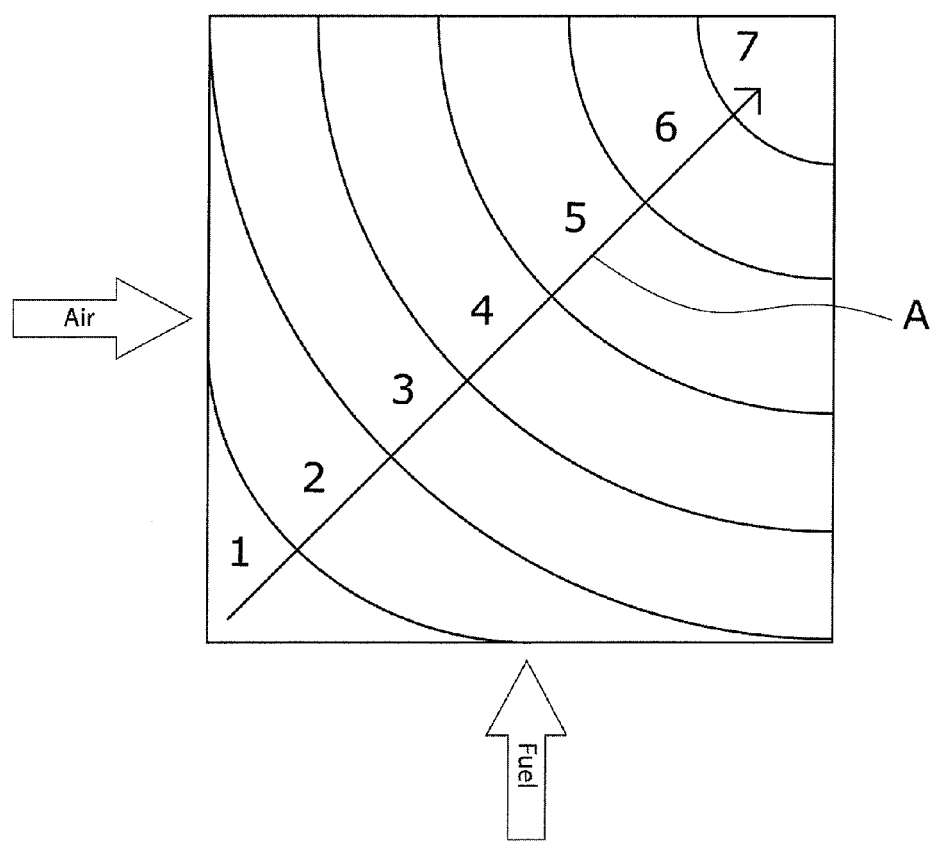
FIG. 10 illustrates another graded structure in accordance with the invention wherein the gradient is diagonally; only a part of all layers is shown.

The temperature in a stack varies in the air flow direction, as outlined above. This results in the air exit region being the most critical for corrosion protection. In this example, the interconnect is protected by a sprayed coating where the composition varied from $Al_2O_3/(LaSr)CoO_3$ 50/50 in the outlet region to (LaSr)CoO3 in the inlet region. The grading was achieved by spraying from multiple containers as outlined above for Example 1. FIG. 10 illustrates the obtained structure.

Example 20

Formation of a SOFC Anode for Reformed Natural Gas—LSCM/Ni

An SOFC anode for reformed natural gas having a graded composition parallel to the direction of the anode gas flow is obtained. The compositions of each of the layers are formed such that an increased electrochemical activity from right to left (gas inlet to outlet) is achieved. The multilayer structure is illustrated in FIG. 2.

Layer 1 consists of LSCM, $(La_{1-x}Sr_x)_s(Cr_{1-y}Mn_y)O_{3-\delta}$, and layer 7 consists of 95 vol % NiO and 5 vol % LSCM. is obtained in seven steps. Layers 2 to 6 consist of a linear grading with Layer 4 having a 1:1 ratio. The electrochemical conversion for $H_2$ is low for LSCM, and high for Ni.

In the first step, seven tapes are produced. Suspensions for tape-casting are manufactured by means of ball milling of powders with polyvinyl pyrrolidone (PVP), polyvinyl butyral (PVB) and EtOH30 MEK as additives. The suspensions are tape-cast using a double doctor blade system and the tapes are subsequently dried.

Layer 1: The suspension comprised LSCM. The green thickness of the tape-cast layer was about 40 μm. The porosity of this layer was about 30% after sintering.

Layer 2: The suspension comprised 83 vol % LSCM and 17 vol % NiO. The green thickness of the tape-cast layer was about 40 μm. The porosity of this layer was about 30% after sintering and reduction of NiO.

Layer 3: The suspension comprised 66 vol % LSCM and 34 vol % NiO. The green thickness of the tape-cast layer was about 40 μm. The porosity of this layer was about 30% after sintering and reduction of NiO.

Layer 4: The suspension comprised 50 vol % LSCM and 50 vol % NiO. The green thickness of the tape-cast layer was about 45 μm. The porosity of this layer was about 30% after sintering and reduction of NiO.

Layer 5: The suspension comprised 34 vol % LSCM and 66 vol % NiO. The green thickness of the tape-cast layer was about 45 μm. The porosity of this layer was about 30% after sintering and reduction of NiO.

Layer 6: The suspension comprised 17 vol % LSCM and 83 vol % NiO. The green thickness of the tape-cast layer about 50 μm. The porosity of this layer was about 30% after sintering and reduction of NiO.

Layer 7: The suspension comprised 5 vol % LSCM and 95 vol % NiO. The green thickness of the tape-cast layer was about 50 μm. The porosity of this layer was about 30% after sintering and reduction of NiO.

In the second step, the tapes were placed onto a Mylar foil as a support layer, as illustrated in FIG. 2, and laminated by employing heated rolls in a double roll set-up, wherein the lamination took place in one pass. The temperature was about 140° C. and the pressure was about 1 bar.

The obtained laminated graded anode was ready to be build into any type of SOC cell.

Example 21

Formation of a SOFC Anode for Reformed Natural Gas—YSZ-LSCM/Ni

An SOFC anode for reformed natural gas having a graded composition parallel to the direction of the anode gas flow is obtained. The compositions of the layers are formed such that there is an increased electrochemical activity going from right to left (gas inlet to outlet). The Example is illustrated in FIG. 2.

Layer 1 consists of 40 vol % yttria stabilized zirconia (YSZ) and 60 vol % LSCM, $(La_{1-x}Sr_x)_s(Cr_{1-y}Mn_y)O_{3-\delta}$ and layer 7 consists of 40 vol % YSZ, 50 vol % NiO and 5 vol % LSCM. Layers 2 to 6 consist of a linear grading with Layer 4 having a 1:1 ratio of LSCM and NiO, The YSZ is kept constant at 45 vol % and LSCM and NiO sums to 55 vol %. The electrochemical activity for conversion of $H_2$ is low for LSCM and high for Ni.

In the first step, seven tapes are produced. Suspensions for tape-casting are manufactured by means of ball milling of powders with polyvinyl pyrrolidone (PVP), polyvinyl butyral (PVB) and EtOH+MEK as additives. The suspensions are tape-cast using a double doctor blade system and the tapes are subsequently dried.

Layer 1: The suspension comprised 40 vol % YSZ and 55 vol % LSCM. The green thickness of the tape-cast layer was about 40 μm. The porosity of this layer was about 30% after sintering.

Layer 2: The suspension comprised 40 vol % YSZ, 50 vol % LSCM and 10 vol % NiO. The green thickness of the tape-cast layer was about 40 μm. The porosity of this layer was about 30% after sintering and reduction of NiO.

Layer 3: The suspension comprised 40 vol % YSZ, 40 vol % LSCM and 20 vol % NiO. The green thickness of the tape-cast layer was about 40 μm. The porosity of this layer was about 30% after sintering and reduction of NiO.

Layer 4: The suspension comprised 40 vol % YSZ, 30 vol % LSCM and 30 vol % NiO. The green thickness of the tape-cast layer was about 45 μm. The porosity of this layer was about 30% after sintering and reduction of NiO.

Layer 5: The suspension comprised 40 vol % YSZ, 20 vol % LSCM and 40 vol % NiO. The green thickness of the tape-cast layer was about 45 μm. The porosity of this layer was about 30% after sintering and reduction of NiO.

Layer 6: The suspension comprised 40 vol % YSZ, 10 vol % LSCM and 50 vol % NiO. The green thickness of the tape-cast layer was about 50 μm. The porosity of this layer was about 30% after sintering and reduction of NiO.

Layer 7: The suspension comprised 40 vol % YSZ, 5 vol % LSCM and 55 vol % NiO. The green thickness of the tape-cast layer was about 50 μm. The porosity of this layer was about 30% after sintering and reduction of NiO.

In the second step, the tapes were placed onto a Mylar foil (support layer) as illustrated in FIG. 2 and laminated by employing heated rolls in a double roll set-up, wherein the lamination took place in one pass. The temperature was about 140° C. and the pressure was about 1 bar.

The laminated graded anode was ready to be build into any type of SOC cell.

Example 22

The anode obtained in Example 20 was built in an anode supported solid oxide cell. In the first step, two tapes were produced: an anode support tape (AS) and an electrolyte tape (E). Suspensions for tape-casting are manufactured and cast as described in Example 1.

AS-layer: The suspension comprised 45 vol % yttria stabilized zirconia (YSZ) and about 55 vol % NiO powder. The green thickness of the tape-cast layer was about 400 μm. The porosity of this layer was about 30% after sintering and reduction.

E-layer: The suspension comprised scandia yttria stabilized zirconia (SYSZ) the green thickness of the tape-cast layer was about 15 μm.

In the second step, the AS and E tapes were laminated together with a graded tape manufactured as described in Example 20. The order of lamination was: AS/graded anode/E. Lamination is performed by employing heated rolls in a double roll set-up. The temperature was about 140° C. and the pressure was about 1 bar.

In the third step, the laminated tapes were cut into the desired shapes. This was done by knife punching resulting in areas of 12×12 cm² after sintering.

In the fourth step, the half-cell was sintered. The half-cell was placed in a furnace and sintered at about 1300° C. and left for about 12 hours before cooling to room temperature.

In the fifth step, a cathode was deposited on the sintered half-cell by screen printing an ink comprising a 1:1 weight ratio mixture of $La_{0.75}Sr_{0.25}MnO_{3-\delta}$ and SYSZ on the surface of the electrolyte layer (E). The thickness of the printed layer was 30 μm before sintering.

The sixth step was the sintering of the cell in a furnace at about 1100° C. for 2 hours before cooling to room temperature so as to obtain the SOC.

Example 23

Formation of an Anode for Direct Conversion of Natural Gas

An SOFC anode for non-reformed natural gas having a graded composition parallel to the direction of the gas flow was obtained. The compositions of the layers were made such that there was an increased electrochemical activity going from right to left (gas inlet to outlet), as illustrated in FIG. 4. The compositions of the five layers were as follows:

Layer 1: STN, $Sr_s(Ti_{1-y}Nb_y)O_{3-\delta}$;
Layer 2: 80 vol % STN, 20 vol % CGO, $Ce_{1-x}Gd_xO_{2-\delta}$;
Layer 3: 75 vol % STN, 20 vol % CGO and 5 vol % NiO;
Layer 4: 65 vol % STN, 20 vol % CGO and 15 vol % NiO;
Layer 5: 55 vol % NiO and 45 vol % STN.

The tapes were manufactured and laminated as described in Example 20.

Example 24

The anode obtained in Example 23 was built in an electrolyte supported cell. The SOFC anode for non-reformed natural gas had a graded composition parallel to the direction of the gas flow. The compositions of the layers were made such that there was an increased electrochemical activity going from right to left (gas inlet to outlet), as illustrated in FIG. 4.

The first step was the manufacture of five screen printing inks having the compositions as given above.

The second step was the deposition of the layers side by side by screen printing.

The cell was completed as outlined in Example 22.

Example 25

SOC Cathode—LSM/LSCF

In order to achieve further balance of the temperature distribution in an SOFC cell stack, the electrochemical activity of the cathode is balanced in this example. In case of cross flow of the air and fuel in the stack, the temperature in the four stack corners will under normal operational conditions be of a lower temperature as compared to the center of the stack as follows: T(air out–$H_2$ in)>T(air in–$H_2$ in)>T(air out–$H_2$ out)>T(air in–$H_2$ out).

The temperature distribution on the cathode side is leveled/controlled by having a cross gradient as illustrated in FIG. 5. The compositions of the layers are as follows:

Layer 1: 50 vol % CGO+50 vol % LSM 25;
Layer 2: 50 vol % CGO+38 vol % LSM+12 vol % LSCF;
Layer 3: 50 vol % CGO+25 vol % LSM+25 vol % LSCF;
Layer 4: 50 vol % CGO+12 vol % LSM+38 vol % LSCF;
Layer 5: 50 vol % CGO+50 vol LSCF.

The tapes are manufactured and laminated as described in Example 20.

Example 26

SOC Cathode—LSM/LSCF

Further balance of the temperature distribution in an SOFC cell stack may be achieved by controlling the electrochemical activity of the cathode. In case of cross flow of the air and fuel in the stack the temperature in the four stack corners will under normal operational conditions be in decreasing order of temperature: T(air out—$H_2$ in)>T(air in–$H_2$ in)>T(air out–$H_2$ out)>T(air in–$H_2$ out).

The temperature distribution on the cathode side is leveled/controlled by having a cross gradient as illustrated in FIG. 5. The compositions of the layers are as follows:

Layer 1: 50 vol % CGO+50 vol % LSCF 25;
Layer 2: 50 vol % CGO+38 vol % LSCF+12 vol % LSC;
Layer 3: 50 vol % CGO+25 vol % LSCF+25 vol % LSC;
Layer 4: 50 vol % CGO+12 vol % LSCF+38 vol % LSC;
Layer 5: 50 vol % CGO+50 vol LSC.

The tapes are manufactured and laminated as described in Example 20 in order to obtain the SOC cathode.

What is claimed is:

1. Apparatus comprising:
a solid oxide fuel cell comprising a graded multilayer structure, the graded multilayer structure comprising a support layer (1) and at least 10 layers (2, 3) forming a graded layer,
wherein each of the at least 10 layers (2, 3) is at least partially in contact with the support layer (1),
wherein the at least 10 layers (2, 3) differ from each other in at least one property selected from layer impurity level, abrasiveness, mechanical strength, and material cost, and
wherein the at least 10 layers (2, 3) are arranged such that the layer impurity level, abrasiveness, mechanical strength, and/or material cost horizontally to the support layer (1) forms a gradient over the total layer area.

2. The apparatus of claim 1, wherein each of the layers (2, 3) is at least partially in contact with the support layer (1) and in contact with at least one other layer.

3. The apparatus of claim 2, wherein the surface of the layers (2,3) which is in contact with the support layer (1) also contacts the surface of at least one other of the layers (2, 3).

4. The apparatus of claim 3, wherein at least one of the layers (2, 3) is formed from a composition comprising LSCM $(La_{1-x}Sr_x)_s(Cr_{1-y}Mn_y)O_{3-\delta}$, yttria stabilized zirconia (YSZ), scandia yttria stabilized zirconia (SYSZ), STN $Sr_s(Ti_{1-y}Nb_y)O_{3-\delta}$, and/or CGO $Ce_{1-x}Gd_xO_{2-\delta}$, with 0<x/y<1 and 0<δ<1.

5. The apparatus of claim 3, wherein at least one of the layers (2, 3) is formed from a composition comprising LSC $(La_{1-x}Sr_x)CoO_{3-\delta}$, LSM $(La_{1-x}Sr_x)MnO_{3-\delta}$, yttria stabilized zirconia (YSZ), scandia yttria stabilized zirconia (SYSZ), CGO $Ce_{1-x}Gd_xO_{2-\delta}$, and/or LSCF $(La_{1-x}Sr_x)_s(Co_{1-y}Fe_y)O_{3-\delta}$, with 0<x/y<1 and 0<δ<1.

6. The apparatus of claim 3, wherein at least one of the layers (2, 3) is formed from a composition comprising MgO, CGO $Ce_{1-x}Gd_xO_{2-\delta}$, Ru, LSCr $(La_{1-x}Sr_x)CrO_{3-\delta}$, LSCrF $(La_{1-x}Sr_x)_s(Cr_{1-y}Fe_y)O_{3-\delta}$, yttria stabilized zirconia (YSZ), scandia yttria stabilized zirconia (SYSZ), and/or LSC $(La_{1-x}Sr_x)CoO_{3-\delta}$, with 0<x/y<1 and 0<δ<1.

7. The apparatus of claim 3, wherein at least one of the layers (2, 3) is formed from a composition comprising doped manganite/cobaltites and metal oxides LSC $(La_{1-x}Sr_x)CoO_{3-\delta}$, with $0<x<1$ and $0<\delta<1$, and/or $Al_2O_3$.

8. The apparatus of claim 1, further comprising an additional layer (4) on top of the layers (2,3), wherein the additional layer contacts all of the layers (2, 3).

9. The apparatus of claim 1, wherein at least one of the layers (2, 3) is a lanthanum strontium chromium oxide layer.

10. The apparatus of claim 1, comprising at least 20 layers.

11. The apparatus of claim 1, wherein the layers (2, 3) are porous layers.

12. The apparatus of claim 1, wherein the at least 10 layers (2, 3) differ from each other in at least layer impurity level and are arranged such that the layer impurity level horizontally to the support layer (1) forms a gradient over the total layer area.

13. The apparatus of claim 1, wherein the at least 10 layers (2, 3) differ from each other in at least layer abrasiveness and are arranged such that the layer abrasiveness horizontally to the support layer (1) forms a gradient over the total layer area.

14. The apparatus of claim 1, wherein the at least 10 layers (2, 3) differ from each other in at least layer mechanical strength and are arranged such that the layer mechanical strength horizontally to the support layer (1) forms a gradient over the total layer area.

15. The apparatus of claim 1, wherein the at least 10 layers (2, 3) differ from each other in at least layer material cost and are arranged such that the layer material cost horizontally to the support layer (1) forms a gradient over the total layer area.

16. The apparatus of claim 1, wherein the graded multilayer structure forms an electrode layer.

17. A method comprising the steps of:
providing a support layer (1);
applying a first layer (2) on top of said support layer (1);
applying a second porous layer (3) such that the second layer (3) is at least partially in contact with the support layer (1);
applying a third to tenth layer such that the each of said layers is at least partially in contact with the support layer (1);
optionally applying at least one further layer such that the further layer is at least partially in contact with the support layer (1);
laminating the multilayer structure; and
producing a solid oxide fuel cell comprising the multilayer structure,
wherein the application of each of the layers is carried out by tape-casting or screen printing; and
wherein the first layer (2), the second layer (3), the third to tenth layers, and the optional at least one further layer are arranged such that the layer impurity level, abrasiveness, mechanical strength, and/or material cost horizontally to the support layer (1) forms a gradient over the total layer area.

18. The method of claim 17, wherein the second layer (3) is applied such that the second layer (3) is at least partially in contact with the support layer (1) and in contact with the first layer (2); and wherein the optional at least one further layer is applied such that the further layer is at least partially in contact with the support layer (1) and in contact with at least one layer.

19. The method of claim 17, wherein the second layer (3) is applied such that the second layer (3) is at least partially in contact with the support layer (1) and in contact with the first layer (2), and wherein the least two layers and the optional layer being in contact with the support layer (1) also contact the surface of at least one of the at least two layers (2, 3).

20. The method of claim 17, wherein the application of the layers is carried out by tape-casting.

21. The method of claim 17, wherein the lamination is carried out at a temperature of at least 100° C.

22. Apparatus comprising:
a solid oxide fuel cell comprising a graded multilayer structure, the graded multilayer structure comprising a support layer (1) and at least two layers (2, 3) forming a graded layer,
wherein each of the at least two layers (2, 3) is at least partially in contact with the support layer (1),
wherein the at least two layers (2, 3) differ from each other in at least one property selected from layer impurity level, abrasiveness, mechanical strength, and material cost,
wherein the at least two layers (2, 3) are arranged such that the layer impurity level, abrasiveness, mechanical strength, and/or material cost horizontally to the support layer (1) forms a gradient over the total layer area, and
wherein the overall thickness of the graded layer comprising the at least two layers (2, 3) is from 5 μm to 200 μm.

23. The apparatus of claim 22, wherein each of the layers (2, 3) is at least partially in contact with the support layer (1) and in contact with at least one other layer.

24. The apparatus of claim 23, wherein the surface of the layers (2,3) which is in contact with the support layer (1) also contacts the surface of at least one other of the layers (2, 3).

25. The apparatus of claim 24, wherein at least one of the layers (2, 3) is formed from a composition comprising LSCM $(La_{1-x}Sr_x)_3(Cr_{1-y}Mn_y)O_{3-\delta}$, yttria stabilized zirconia (YSZ), scandia yttria stabilized zirconia (SYSZ), STN $Sr_s(Ti_{1-y}Nb_y)O_{3-\delta}$, and/or CGO $Ce_{1-x}Gd_xO_{2-\delta}$, with $0<x/y<1$ and $0<\delta<1$.

26. The apparatus of claim 24, wherein at least one of the layers (2, 3) is formed from a composition comprising LSC $(La_{1-x}Sr_x)CoO_{3-\delta}$, LSM $(La_{1-x}Sr_x)MnO_{3-\delta}$, yttria stabilized zirconia (YSZ), scandia yttria stabilized zirconia (SYSZ), CGO $Ce_{1-x}Gd_xO_{2-\delta}$, and/or LSCF $(La_{1-x}Sr_x)_s(Co_{1-y}Fe_y)O_{3-\delta}$, with $0<x/y<1$ and $0<\delta<1$.

27. The apparatus of claim 24, wherein at least one of the layers (2, 3) is formed from a composition comprising MgO, CGO $Ce_{1-x}Gd_xO_{2-\delta}$, Ru, LSCr $(La_{1-x}Sr_x)CrO_{3-\delta}$, LSCrF $(La_{1-x}Sr_x)_s(Cr_{1-y}Fe_y)O_{3-\delta}$, yttria stabilized zirconia (YSZ), scandia yttria stabilized zirconia (SYSZ), and/or LSC $(La_{1-x}Sr_x)CoO_{3-\delta}$, with $0<x/y<1$ and $0<\delta<1$.

28. The apparatus of claim 24, wherein at least one of the layers (2, 3) is formed from a composition comprising doped manganite/cobaltites and metal oxides LSC $(La_{1-x}Sr_x)CoO_{3-\delta}$, with $0<x<1$ and $0<\delta<1$, and/or $Al_2O_3$.

29. The apparatus of claim 22, further comprising an additional layer (4) on top of the layers (2,3), wherein the additional layer contacts all of the layers (2, 3).

30. The apparatus of claim 22, wherein at least one of the layers (2, 3) is a lanthanum strontium chromium oxide layer.

31. The apparatus of claim 22, comprising at least 20 layers.

32. The apparatus of claim 22, wherein the layers (2, 3) are porous layers.

33. The apparatus of claim 22, wherein the graded multilayer structure forms an electrode layer.

34. A method comprising the steps of:
providing a support layer (1);
applying a first layer (2) on top of said support layer (1);
applying a second porous layer (3) such that the second layer (3) is at least partially in contact with the support layer (1);
optionally applying at least one further layer such that the further layer is at least partially in contact with the support layer (1);
laminating the multilayer structure; and producing a solid oxide fuel cell comprising the multilayer structure, wherein the application of each of the layers is carried out by tape-casting or screen printing;

wherein the first layer (2), the second layer (3), and the optional at least one further layer are arranged such that the layer impurity level, abrasiveness, mechanical strength, and/or material cost horizontally to the support layer (1) forms a gradient over the total layer area; and wherein the overall thickness of the graded layer comprising the at least two layers (2, 3) is from 5 μm to 200 μm.

35. The method of claim 34, wherein the second layer (3) is applied such that the second layer (3) is at least partially in contact with the support layer (1) and in contact with the first layer (2); and wherein the optional at least one further layer is applied such that the further layer is at least partially in contact with the support layer (1) and in contact with at least one layer.

36. The method of claim 34, wherein the second layer (3) is applied such that the second layer (3) is at least partially in contact with the support layer (1) and in contact with the first layer (2), and wherein the least two layers and the optional layer being in contact with the support layer (1) also contact the surface of at least one of the at least two layers (2, 3).

37. The method of claim 34, wherein the application of the layers is carried out by tape-casting.

38. The method of claim 34, wherein the lamination is carried out at a temperature of at least 100° C.

\* \* \* \* \*